June 5, 1934.     A. J. CAWLEY     1,962,055
SOUND REPRODUCING APPARATUS
Filed July 27, 1931
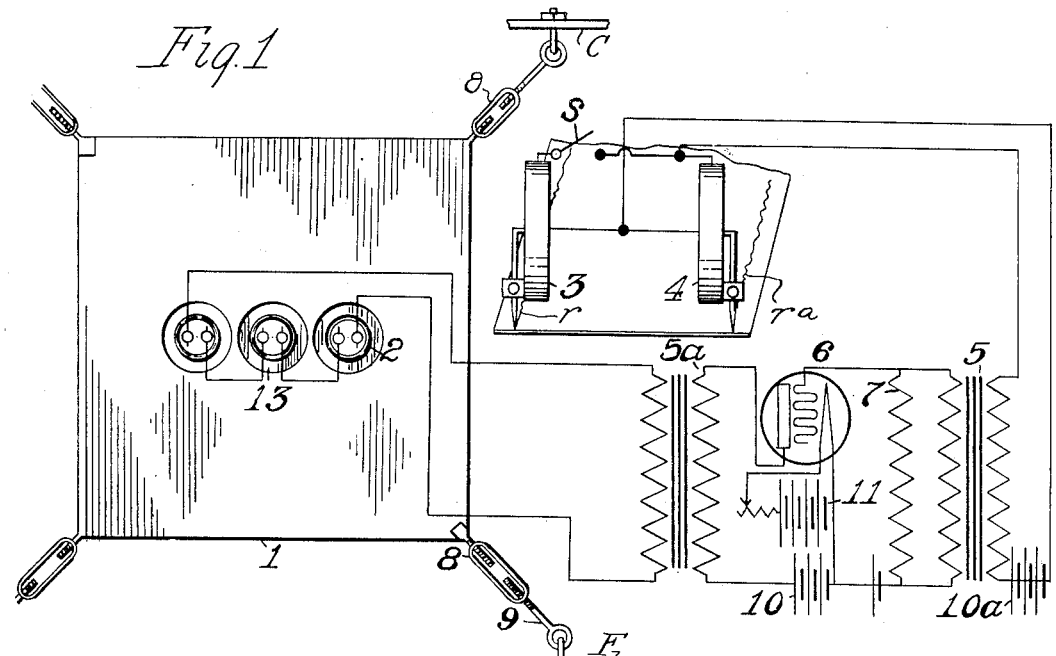
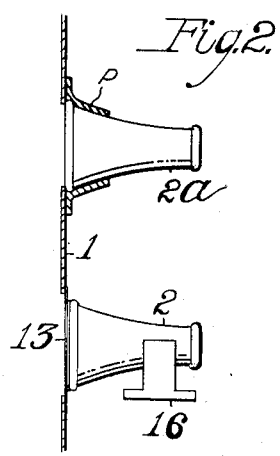
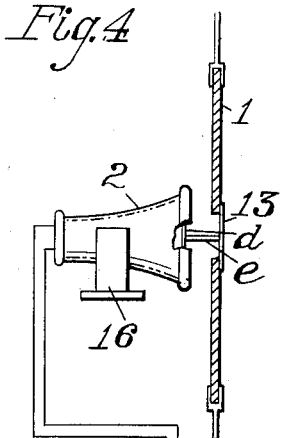
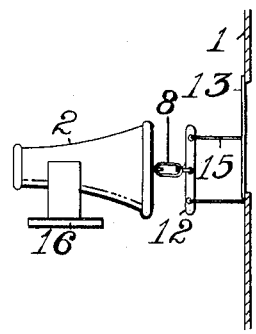
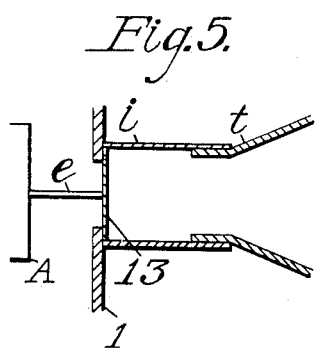
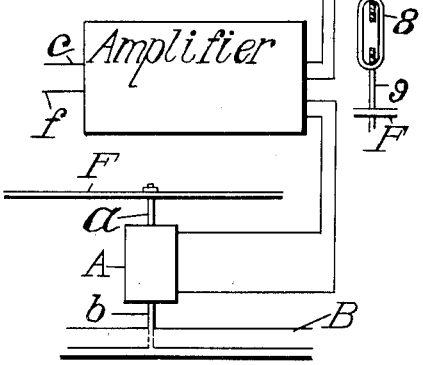
INVENTOR
Aloysius J. Cawley Patented June 5, 1934

1,962,055

UNITED STATES PATENT OFFICE 1,962,055

SOUND REPRODUCING APPARATUS

Aloysius J. Cawley, Pittston, Pa.

Application July 27, 1931, Serial No. 553,405

15 Claims. (Cl. 181—31)

This application is a continuation-in-part application of my applications Serial No. 435,983, filed January 8, 1921, maturing in Patent No. 1,816,360, for Electrical sound reproducing process and Serial No. 371,020, for Sound record process, filed June 14, 1929. This application is also a substitute application for application Serial No. 443,458 of Feb. 8, 1921.

The invention relates to method and means for obtaining clearer, more realistic and more faithful reproduction of sounds, particularly those of deep tone.

An object of the invention is the use of a plurality of reproducers having different characteristics of vibration. A plurality of sound records having different characteristics is also another object of the invention.

Another object is the use of a loud speaking device consisting of a very large diaphragm or sounding board coacting with one or more small diaphragms, both being electromagnetically operated.

Means for causing the walls, ceiling and floor of a building such as a theatre to be brought into vibration in accordance with the sounds being reproduced is also another object.

Other advantages and objects of the arrangements will be apparent from a consideration of the following specification and claims when read in conjunction with the accompanying drawings wherein the various figures thereof represent in a conventional manner, the principles covered by the invention.

Figure 1 is an illustration of a plurality of sound reproducers coacting with sound record grooves carried on a motion picture film, a large sounding board or diaphragm together with one or more small diaphragms reproduce the sounds.

Figure 2 illustrates two different methods of causing the small diaphragm to actuate the large sounding board.

Figure 3 shows another method by which the small diaphragm actuates the larger one.

Figure 4 shows a method and apparatus for causing the walls, ceiling and floor of a building such as a theatre to be brought into vibration in accordance with the sounds to be reproduced.

Figure 5 is an illustration of a means for actuating a small and a large diaphragm and causing their sound waves to be amplified by a suitable horn.

A reproducing arrangement is shown in Figure 1 which has as its object the faithful rendition or reproduction of a very wide variety of sounds, including everything from the highest pitched sounds to the deepest and most sonorous including every possible timbre of the sounds. Two electromechanical sound reproducers 3 and 4 are shown each with its stylus in contact with a separate sound record on each margin of a motion picture film. The sound records r and ra have been impressed by different types of recorders and possess different characteristics, so that a wider range of sounds is covered by the recording than could be done by a single recorder. It is a well known fact that a single recorder or reproducer can only respond to a limited range of sounds. The switch S indicates that one or both reproducers may be used at will. While a mechanical type of reproducer is illustrated, the invention is intended to cover any type, particularly the photographic type. Source of power, such as battery 10a is in circuit with the reproducers, and includes any type of amplifying means in the circuit such as that illustrated, which is an ordinary audion amplifying circuit, containing the audion 6, transformers 5 and 5a, batteries 10 and 11. The amplified current is then led to the phonographic reproducers, which consist of powerful telephone receivers or their equivalent electromechanical elements. Those are illustrated at 2, being attached in various ways later to be described to the large sounding board 1. The telephone receivers are shown as cooperating with diaphragms 13, which are fitted into openings in the sounding board 1. It will be noted that the latter diaphragms are much thinner than the large diaphragm or sounding board.

The large thick diaphragm 1 is shown as being attached to the floor F or ceiling C of a building such as a theatre by means of wire or rope. Means for giving variable degrees of tightness to the wires are shown, for instance as turnbuckles 8 adjusting the wires 9. The small diaphragms of the telephone receivers will vibrate readily on all types of sound currents which traverse them. However, their fidelity is greatly reduced in reproducing low pitched sounds. Here the large diaphragm will take up the vibrations when they become slow enough to approach the natural period of the larger diaphragm. The large diaphragm may be any size desired. In the theatrical environment it is desirable that, the large diaphragm should be not less than six or eight feet square, but the invention is not limited to this. The large diaphragm may be larger or smaller than this, particularly in other environments. The small diaphragm may be likened to the soldier crossing the bridge, when if the frequency of his steps approach that of the natural period of vibration of the bridge, a very powerful vibration of the latter is produced. The mechanism by which the small diaphragm sets the large diaphragm in vibration is known in acoustics as reinforced resonance, and is used in one or more modifications illustrated in the drawing. However, the diaphragm may be set in vibration directly, as by attaching wires to it, as shown in some of the modifications. It is also to be noted that the small diaphragm will also impart a certain amount of vibration of the higher pitched type to the diaphragm. The object of the turnbuckles, or other tightening means is to give a tuning effect to the large diaphragm, whereby it may tend to respond to different sounds, in a way similar to the tuning of a kettle drum. Moreover, different portions of the large diaphragms may be tuned to different pitches, as by giving different degrees of tightness to different turnbuckles. The invention therefore, is concerned with the faithful rendition of both high pitched and low pitched sounds. Thus one great drawback of phonographic reproduction is overcome.

Figure 2 illustrates a modification in which the telephone receiver 2a or other electromagnetic means may be attached bodily to the large diaphragm by for instance soldering the metal portion of 2a to the diaphragm, or by means of the metal straps p which are attached by any means such as screws to the diaphragm as shown in Figure 2. A modification is also illustrated wherein the telephone receiver 2 is mounted upon a firm support 16. It then acts to attract the small diaphragm 13 and to thus reproduce sounds. Diaphragm 13 covers an opening in large diaphragm 1, and tends to set the latter in vibration by means of reinforced resonance.

Figure 3 illustrates another modification of the invention. The sound reproducing means 2 is supported on the firm support 16. Its diaphragm is connected by means of a wire to the lever 12 at the middle portion of the latter. This wire contains a turnbuckle 8 by which varying degrees of tension may be given for tuning purposes. A wire 15 connects one end of the lever 12 to the small diaphragm 13, while another similar wire connects the other end of the lever 12 to the large diaphragm 1. It will be seen that as the diaphragm of the telephone 2 vibrates, its vibrations will be transmitted to the two diaphragms 13 and 1. The deeper vibrations will be transmitted to diaphragm 1 and the higher pitched diaphragm will be vibrated by the higher pitched sounds. As the pitch becomes lower and lower, the large diaphragm 1 will enter more and more into vibration. In the deeper register, covering the reproduction of cannon, thunder and the like, the large diaphragm will be brought more and more into play.

Another modification of the invention is illustrated in Figure 4. The wires c and f convey the current to the amplifier from whence two currents are supplied, one to the receiver 2 and the other to the electromagnetic means A, which is very powerful, and may be that which is similar to that used in deep sea signalling. Receiver 2 is firmly held by support 16, while its diaphragm is connected by a wire e to the thin diaphragm 13, which is mounted upon the large thick diaphragm 1 and covers an opening therein. Large diaphragm 1 is shown as connected to the floor F of a building such as a theatre through the turnbuckle 8 and the wire 9. The large diaphragm can thus be tuned to any desired frequency. The illustration of the two currents being led off from the amplifier is intended merely for illustration purposes, as a single current may supply either A or 2. A very powerful electromagnetic means is illustrated at A, which is connected by the wire or rod a to the floor F of a building such as a theatre and by the wire or rod b to the beam or girder which may be embedded in concrete, in order to form a firm, absolutely immobile support. All of the vibrations are then transmitted to the floor F of a building such as a theatre, and this makes a very realistic reproduction of sounds possible. Many effects otherwise unattainable are possible with this feature of the invention. Sounds of thunder, storms, cannon volcanoes, falling buildings are all possible in a very realistic manner.

Figure 5 illustrates still another modification of the invention. The rectangle A represents any powerful apparatus for transforming sound modulated electric current into powerful mechanical vibration representing sounds. This transmits vibrations by means of the wire e to the diaphragm 13. The diaphragm 13 is firmly attached to the large diaphragm 1 and covers an opening therein. This diaphragm also fits into or acts to close the end of the tube i in order that its vibrations may be transmitted therethrough. However, the diaphragm is fitted into the tube very tightly. There is no leakage of air. The tube i is made of any resilient substance, such as for instance, rubber, and is connected at its other end with the amplifying horn t, which may be an exponential horn. The resilient tube i will not dampen the vibrations of either 1 or 13. As A produces powerful vibrations of the diaphragm 13, they are transmitted through the horn t and are therein amplified to a great degree. However, in reproduction of cannon shots, thunder, and other deep, loud noises, they are not sufficiently faithful to the original sounds. When such loud deep toned sounds are being reproduced, they will cause the vibration of the large diaphragm 1 also, and a loud realistic reproduction will result.

Having described my invention, I claim as new and desire to secure by Letters Patent:

1. A sound reproducing device consisting of a large diaphragm tightly suspended by its periphery from a theatre body, means for producing radial tension between said diaphragm and said theatre body and a telephone receiver mounted upon said diaphragm.

2. A loud speaking sound reproducing apparatus for direct cooperation with the air without the use of an amplifying horn consisting of a large diaphragm tightly suspended by its periphery from the body of a theatre, a small diaphragm attached directly thereto and a fixedly supported electromagnetic sound reproducer connected to said small diaphragm acting to produce vibrations corresponding to sounds in both of said diaphragms.

3. A sound reproducing device consisting of a large diaphragm tightly suspended by its periphery from the body of a theatre, a small diaphragm attached directly to said large diaphragm and a fixedly supported electromagnetic sound reproducer attached to both of said diaphragms to produce vibrations corresponding to sounds therein.

4. Means for imparting sound vibrations to the bodies of spectators consisting of a theatre in which sound pictures are displayed, said theatre being provided with a floor upon which spectators are supported, means for vibrating said floor in accordance with sound waves and means for producing amplified sound modulated electric current in cooperative relation with said means for vibrating said floor.

5. A sound reproducing device consisting of a large diaphragm supported under tension, a small diaphragm attached to said large diaphragm, means for setting both diaphragms vibrating in accordance with sounds and an acoustic amplifying means in cooperative relation with said large and small diaphragms conveying and amplifying the sounds emanating from said large and small diaphragms.

6. A sound reproducing device consisting of a large diaphragm, means for subjecting said large diaphragm to radial tension at its periphery, a fixedly mounted telephone receiver whose diaphragm is attached directly to said large diaphragm and a source of amplified sound modulated electric current operatively connected to said telephone receiver to cause the said diaphragm of said receiver to vibrate in accordance with sound and impart sound vibrations to said large diaphragm.

7. A sound reproducing device consisting of a large diaphragm, means for subjecting said large diaphragm to radial tension at its periphery, a fixedly mounted telephonic receiver attached directly under tension to said diaphragm and means for adjusting the tension of different portions of said large diaphragm.

8. In combination: a thick diaphragm provided with an opening through its body and a thin diaphragm attached to the margins of and covering said opening in said thick diaphragm, said thin diaphragm having a diameter of the general order of magnitude of an ordinary phonographic reproducing diaphragm.

9. In combination: a large diaphragm, a portion of said diaphragm being much thinner than the major portion of said diaphragm and means for imparting sound vibrations to said thinner portion of said diaphragm attached to said thinner portion, said thinner portion being of the order of magnitude of an ordinary phonographic reproducing diaphragm.

10. In combination: a large, thick diaphragm provided with an opening through its body, tensing means attaching the periphery of said large diaphragm to a supporting means, a thin diaphragm attached to the margins of and covering said opening in said large diaphragm said thin diaphragm having a diameter of the general order of magnitude as an ordinary phonographic reproducing diaphragm and means for imparting sound vibrations attached to said thin diaphragm.

11. In combination: a large diaphragm provided with an opening through its body, a tensing means attaching the periphery of said large diaphragm to a supporting means, means for varying the tension of said tensing means in order to tune said diaphragm to respond to particular vibrations, a thin diaphragm attached to the margins of and covering said opening in said diaphragm, and means for imparting sound vibrations in cooperative relation with said thin diaphragm.

12. In combination: a large diaphragm, tensing means attached to the periphery of said large diaphragm and to a supporting means, said tensing means acting to place different portions of said diaphragm under different degrees of strain in order that said different portions will respond to different vibration rates, said large diaphragm being provided with a thinner portion and means for imparting sound vibrations attached to said thinner portion.

13. In combination: a large thick diaphragm suspended under tension by its periphery, said large diaphragm having an opening through its body, a small thin diaphragm attached to the margins of and covering said opening, electromagnetic means supplied with sound modulated current connected to and acting to impart vibrations to said small diaphragm and an amplifying horn resiliently connected by means of an approximately air-tight connection to said small diaphragm in order to amplify the sound waves emanating from said small diaphragm.

14. In combination: a large diaphragm suspended under tension by its periphery, said large diaphragm having an opening through its body, a small thin diaphragm attached to the margins of and covering said opening, electromagnetic means supplied with sound modulated electric current connected to and acting to impart vibrations to both of said diaphragms to produce sound waves of widely differing frequencies therein.

15. A loud speaking sound reproducing apparatus for direct cooperation with the air without the use of an amplifying horn consisting of a large thick diaphragm suspended under tension from its periphery, a small diaphragm attached directly to said large diaphragm, said small diaphragm having a diameter of the general order of magnitude as an ordinary reproducing diaphragm both surfaces of said small diaphragm being in direct, unobstructed contact with the surrounding atmosphere in order to impart vibrations thereto.

ALOYSIUS J. CAWLEY.